United States Patent
Baba et al.

(10) Patent No.: US 7,754,081 B2
(45) Date of Patent: Jul. 13, 2010

(54) METHOD OF WASTEWATER TREATMENT WITH EXCESS SLUDGE WITHDRAWAL REDUCED

(75) Inventors: Yasuhiro Baba, Saijo (JP); Hiroaki Fujii, Saijo (JP); Hidehiko Okabe, Saijo (JP); Goro Kobayashi, Osaka (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 338 days.

(21) Appl. No.: 11/632,482

(22) PCT Filed: Jul. 15, 2005

(86) PCT No.: PCT/JP2005/013186

§ 371 (c)(1),
(2), (4) Date: Jan. 4, 2008

(87) PCT Pub. No.: WO2006/009125

PCT Pub. Date: Jan. 26, 2006

(65) Prior Publication Data

US 2009/0039015 A1    Feb. 12, 2009

(30) Foreign Application Priority Data

Jul. 16, 2004    (JP) .............................. 2004-210301
Jul. 16, 2004    (JP) .............................. 2004-210302
Jul. 16, 2004    (JP) .............................. 2004-210303

(51) Int. Cl.
    *C02F 3/30* (2006.01)
(52) U.S. Cl. ............... 210/605; 210/609; 210/615; 210/623; 210/630; 210/631; 210/908
(58) Field of Classification Search ........... 210/605, 210/609, 615–617, 621–623, 630, 631, 903, 210/908

See application file for complete search history.

(56) References Cited

U.S. PATENT DOCUMENTS 3,980,556 A * 9/1976 Besik .................. 210/616

(Continued)

FOREIGN PATENT DOCUMENTS

CN    1127454 C    11/2003

(Continued)

OTHER PUBLICATIONS

Hironobu Teramoto, "Advanced Treatment for Waste Water Utilizing Immersion. Type Hollow Fiber System and Troubleshooting", New Technology for Water Treatment Utilizing Membrane, pp. 75-77, 2000.

(Continued)

*Primary Examiner*—Fred Prince
(74) *Attorney, Agent, or Firm*—Oblon, Spivak, McClelland, Maier & Neustadt, L.L.P.

(57) ABSTRACT

A method of wastewater treatment that reduced equipment cost and running cost and realizes high efficiency implementation and further tank miniaturization, and that reduces excess sludge withdrawal. There is provided a method of wastewater treatment with excess sludge withdrawal reduced, characterized in that there are installed an aeration tank wherein wastewater is brought into contact with carrier particles under aerobic conditions, a total oxidization tank and a sedimentation tank, and that operation is made while maintaining the BOD sludge load in the total oxidization tank at 0.08 kg-BOD/Kg-MLSS*day or smaller, and that a coagulant is charged in the complete oxidization tank in order to improve the setting in the sedimentation tank.

27 Claims, 5 Drawing Sheets

U.S. PATENT DOCUMENTS 4,011,156 A * 3/1977 Dubach et al. ............. 210/621
6,007,712 A    12/1999 Tanaka et al.
6,461,511 B1 * 10/2002 Baba et al. ................. 210/616

FOREIGN PATENT DOCUMENTS

| | | |
|---|---|---|
| JP | 58-64197 A * | 4/1983 |
| JP | 7 124584 | 5/1995 |
| JP | 11 042497 | 2/1999 |
| JP | 2001 205290 | 7/2001 |
| JP | 2001 347284 | 12/2001 |
| JP | 2002 59185 | 2/2002 |
| JP | 2002 191942 | 7/2002 |

OTHER PUBLICATIONS

"Various Activated Sludge Method", 5th Edition, Technology and Regulation for Pollution Prevention, p. 197, 1995.
Kogyo Chousa-Kai, "Environment Conservation and Waste Processing", Guide to all Technologies, p. 70-71, 2002.
"Highly Functional Activated Sludge Process Utilizing Biotechnology" Gihodo Pub., p. 150-151 & 276-277, 1989.
U.S. Appl. No. 12/161,178, filed Jul. 17, 2008, Baba, et al.

* cited by examiner

METHOD OF WASTEWATER TREATMENT WITH EXCESS SLUDGE WITHDRAWAL REDUCED

BACKGROUND OF THE INVENTION

1. Field of the Invention

The present invention relates to a wastewater treatment method, in which withdrawal of an excess sludge is reduced.

2. Description of the Prior Art

Hitherto, according to the wastewater treatment method relying on the activated sludge process, the wastewater treatment system can be steadily operated under a condition, in which the BOD volume load is within the range of about 0.3 to 0.8 kg/cm$^3$*day ("*" represents multiplication), when wastewater is brought into contact with an activated sludge under an aerobic within an aeration tank and is then sedimented within a sedimentation tank while the sludge is in part returned to the aeration tank and is in part withdrawn as an excess sludge. (See, for example, the Non-patent Document 1 below.) On the other hand, a carrier capable of holding microorganisms in a high density have now been developed and, by using the carrier, high BOD volume load of 2 to 5 kg/m$^3$.day can be imposed enough to allow the aeration tank to be compactized. (See, for example, the Non-patent Document 2 below.)

With the conventional activated sludge process, the system must be operated with the BOD volume load of about 0.3 to 0.8 kg/cm$^3$*day, requiring the use of a large aeration tank. In the system operation according to the activated sludge process under such a high BOD volume load, not only does the treatment become insufficient, but the settleability decreases, accompanied by difficulty in separating the sludge in the sedimentation tank in the subsequent stage to such an extent as to result in difficulty in operating the system steadily. Also with the conventional activated sludge process, about 50% of the removed BOD is said to transform into sludge, and such a so-called excess sludge is required to be finally disposed in such a way as to be reclaimed in lands or incinerated after having been withdrawn out of the system and subsequently dehydrated. It is theoretically possible to configure a system that generates no excess sludge by establishing a totally oxidized condition, in which the rate of growth of the sludge and the rate of self-oxidization of the sludge are counterbalanced with each other, instead of withdrawing the sludge. However, establishment of the totally oxidized condition within the activated sludge tank results in considerable increase of MLSS within the aeration tank, raising a problem in that a considerably large activated sludge tank must be provided for. In such case, there is another problem in that the sludge would be so refined as to make it difficult to separate the sludge by spontaneous sedimentation.

In view of the incapability of any treated water being drained unless precipitation of the sludge is achieved, the system to improve the sludge settleability is suggested, in which a load is applied to the activated sludge so that the BOD sludge load within the activated sludge tank may fall within the range of 0.08 to 0.2 kg-BOD/kg-ss*day. However, this method, in which the load is applied, has been found difficult in reducing the amount of the excess sludge withdrawn. (See, for example, the Patent Document 1 below.)

As a method of removing nitrogen contained in wastewater being treated, the three-step activated sludge method, the Wuhmann method, and the Barnad method have long been well known. Any one of those known methods includes a step of contacting wastewater containing nitrogen with nitrifying bacteria under the aerobic condition within a nitrifying tank to oxidize ammonium-nitrogen to nitrite-nitrogen and nitrate-nitrogen, and a step of contacting wastewater with denitrifying bacteria under the anaerobic condition within the denitrifying tank to reduce the nitrite-nitrogen and nitrate-nitrogen to a nitrogen gas. (See, for example, the Non-patent Document 3 below.)

With the conventional wastewater treatment method utilizing the activated sludge for treating wastewater containing nitrogen, an excess sludge tends to be generated during steps of removing the BOD and nitrogen and, therefore, it is required to perform a final disposal such as, for example, reclamation or incineration after the excess sludge has been withdrawn out of the system and then dehydrated. It is theoretically possible to configure a system that generates no excess sludge by establishing a totally oxidized condition which the rate of growth of the sludge and the rate of self-oxidization of the sludge are counterbalanced with each other, instead of withdrawing the sludge. However, establishment of the totally oxidized condition within the activated sludge tank results in considerable increase of MLSS within the aeration tank, raising a problem in that a considerably large activated sludge tank must be provided for. In such case, there is another problem in that the sludge would be so refined as to make it difficult to separate the sludge by spontaneous sedimentation. While it is generally practiced that in the sedimentation tank a coagulant is added to sediment the sludge in the course of the standard wastewater treatment, the use has not been made of the coagulant in the total oxidization tank that is used for volume reduction of the excess sludge, because addition of the coagulant into, for example, the aeration tank will allow the sludge to sediment to such an extent that no sufficient aeration can take place within the aeration tank and because a substantial amount of sludge sedimented within the sedimentation tank is drained out of the system as an excess sludge.

The inventors of the present invention have suggested a waste treatment apparatus and a method therefor, in which the total oxidization tank and the aeration tank utilizing a microorganism-immobilized carrier are utilized in combination with separation membranes to eliminate generation of the excess sludge, but have been found involving such a problem that since the separation membrane that can be suitably used has a pore size not greater than 0.1 μm, the permeate flux is extremely low and, on the other hand, the required transmembrane apparatus tends to become bulky, resulting in increase of the cost of equipments and the running cost. (See, for example, the Patent Document 2 below.) Also, no removal of nitrogen is mentioned.

The following prior art documents are available, which appear to be pertinent to the present invention:

Non-patent Document 1:

"5-tei, Kougai-bousi no Gijutsu to Houki (Suishitsu-hen) (5th-ver. Pollution Control and Regulations)" edited by Kougai-boushi Gijutsu to Houki-hennshu Iin-kai and published from Sangyo Kankyo Kannri Kyokai, 7th-ed, Jun. 12, 2001, pp 197.

Non-patent Document 2:

"Kankyo-hozen•Haikibutsu-shori: Sougougijutsu Gaido (Environment Conservation and Waste Processing: Guide to All Technologies)", Kogyo Chousa-kai, Feb. 12, 2002, pp 70.

Non-patent Document 3:

"Baiotekunoroji-katsuyo no Koukinou-gata Kassei Odei-hou (Highly Functional Activated Sludge Process Utilizing Biotechnology)", Gihodo Pub., May 1, 1989, pp 150.

Patent Document 1:
   JP Laid-open Patent Publication No. 2001-347284

Patent Document 2:
   JP Laid-open Patent Publication No. 2001-205290

SUMMARY OF THE INVENTION (Problems to be Solved by the Invention)

An object of the present invention is to provide a wastewater treatment method, which can be practiced highly efficiently while the cost of equipments and the running cost are reduced, and in which tanks can be compactized and the excess sludge is minimized.

(Means for Solving the Problems)

In order to alleviate the foregoing problems, the wastewater treatment method of the present invention includes an aeration step of contacting wastewater with a microorganism-immobilized carrier under an aerobic condition within an aeration tank, a total oxidization step of self-oxidizing a sludge under an aerobic condition within a total oxidization tank with a BOD sludge load set to 0.08 kg-BOD/Kg-MLSS*day or smaller; and a sedimentation step of sedimenting the sludge within a sedimentation tank; the steps being sequentially performed in this order, in which method a coagulant is added to the total oxidization tank.

By aerating the wastewater at a low sludge load within the total oxidization tank, the rate of growth of the sludge and the rate of self-oxidization of the sludge can be counterbalanced with each other, to thereby avoid increase of the sludge. For this purpose, the s-BOD sludge load within the total oxidization tank is required to be 0.08 kg-BOD/kg-MLSS*day or smaller and, preferably, 0.05 kg-BOD/kg-MLSS*day or smaller. In general, when the system is operated under such a low sludge load, the sludge will disperse and fail to sediment spontaneously, posing a problem in that separation of the sludge is difficult to achieve. Accordingly, in the wastewater treatment method of the present invention, the coagulant is added to the total oxidization tank to improve the settleability of the sludge and, in the event that the settleability decreases subsequently, the coagulant is again added. However, too much addition of the coagulant will result in formation of a solid component, which leads to increase of the amount of the sludge withdrawn. Therefore, the amount of addition must be minimized.

Also, the nitrogen-containing wastewater treatment method of the present invention designed to alleviate the foregoing problems with minimized excess sludge withdrawal includes an nitrification step of contacting wastewater with nitrifying bacteria under an aerobic condition within a nitrification tank, a denitrification step of contacting the wastewater with denitrifying bacteria under an anaerobic condition within a denitrification tank, a total oxidization step of self-oxidizing a sludge under an aerobic condition within a total oxidization tank with a BOD sludge load set to 0.08 kg-BOD/Kg-MLSS*day or smaller, and a sedimentation step of separating between the sludge and a treated water, in which method a coagulant is added during the total oxidization step.

When the total oxidization tank is disposed in a stage following the removal of the nitrogen and aeration takes place under a low sludge load, the rate of growth of the sludge and the rate of self-oxidization of the sludge can be counterbalanced with each other, to thereby avoid increase of the sludge. For this purpose, the s-BOD sludge load within the total oxidization tank is required to be 0.08 kg-BOD/kg-MLSS*day or smaller and, preferably, 0.05 kg-BOD/kg-MLSS*day or smaller. In general, if the system is operated under such a low sludge load, the sludge will disperse and fail to sediment spontaneously, posing a problem in that separation of the sludge is difficult to achieve. Accordingly, in the wastewater treatment method of the present invention, the coagulant is added to the total oxidization tank to improve the settleability of the sludge and, in the event that the settleability decreases subsequently, the coagulant is again added. However, too much addition of the coagulant will result in formation of a solid component, which leads to increase of the amount of the sludge withdrawn and, therefore, the amount of addition must be minimized.

Further, the nitrogen-containing wastewater treatment method of the present invention designed to alleviate the foregoing problems includes a nitrification step of contacting wastewater with nitrifying bacteria under an aerobic condition within a nitrification tank, a denitrification step of contacting the wastewater with denitrifying bacteria under an anaerobic condition within a denitrification tank, a total oxidization step of self-oxidizing a sludge under an aerobic condition with a BOD sludge load set to 0.08 kg-BOD/Kg-MLSS*day or smaller; and a filteration step of filtering the sludge with a separation membrane having a pore size within the range of 0.1 to 5 µm, the steps being sequentially performed in this order, in which method a coagulant is added during the total oxidization step.

When the total oxidization tank is disposed in a stage following the removal of the nitrogen and aeration takes place under a low sludge load, the rate of growth of the sludge and the rate of self-oxidization of the sludge can be counterbalanced with each other, to thereby avoid increase of the sludge. For this purpose, the s-BOD sludge load within the total oxidization tank is required to be 0.08 kg-BOD/kg-MLSS*day or smaller and, preferably, 0.05 kg-BOD/kg-MLSS*day or smaller. In general, if the system is operated under such a low sludge load, the sludge will disperse and fail to sediment spontaneously, posing a problem in that separation of the sludge is difficult to achieve. Accordingly, in the wastewater treatment method of the present invention, the coagulant is added to the total oxidization tank to improve the settleability of the sludge and, in the event that the settleability decreases subsequently, the coagulant is again added. However, too much addition of the coagulant will result in formation of a solid component, which leads to increase of the amount of the sludge withdrawn and, therefore, the amount of addition must be minimized.

(Effects of the Invention)

In view of the foregoing, with the wastewater treatment method of the present invention or the nitrogen-containing wastewater treatment method of the present invention, the operation with minimized excess sludge withdrawal can be continued. If with the standard activated sludge process, one attempts to create a complete oxidization state, an extremely bulky activated sludge tank must be employed as hereinbefore described. In the practice of the wastewater treatment method of the present invention which is suitably employed, the use is made of a carrier method, wherefore the BOD volume load high of 2 Kg/cm$^3$ or more and, preferably, 5 Kg/m$^3$ or more can be loaded, making it possible to reduce the size of the aeration tank. Since a major portion of the BOD contained in the wastewater can be removed within the aeration tank, no bulky total oxidization tank is necessary and the rate of growth of the sludge and the rate of self-oxidization of the sludge are counterbalanced with each other to thereby minimize the withdrawal of the excess sludge. Also, since when the coagulant is added, the particle size of the sludge increases, a solid-liquid separation is possible within the sedimentation tank or by the separation membrane and the cost of equipments and the running cost can be suppressed. Yet, since the coagulant so added can be suppressed from being discharged out of the system during the sedimentation step and the amount thereof tending to be discharged out of the system reduces, it is possible to reduce the amount of the coagulant supplementally added in order to maintain the coagulating effect, making it possible to accomplish the treatment with high efficiency and, therefore, the effect so the coagulant can be maintained for a long period of time.

EXPLANATION OF REFERENCE NUMERALS

Figure 1:
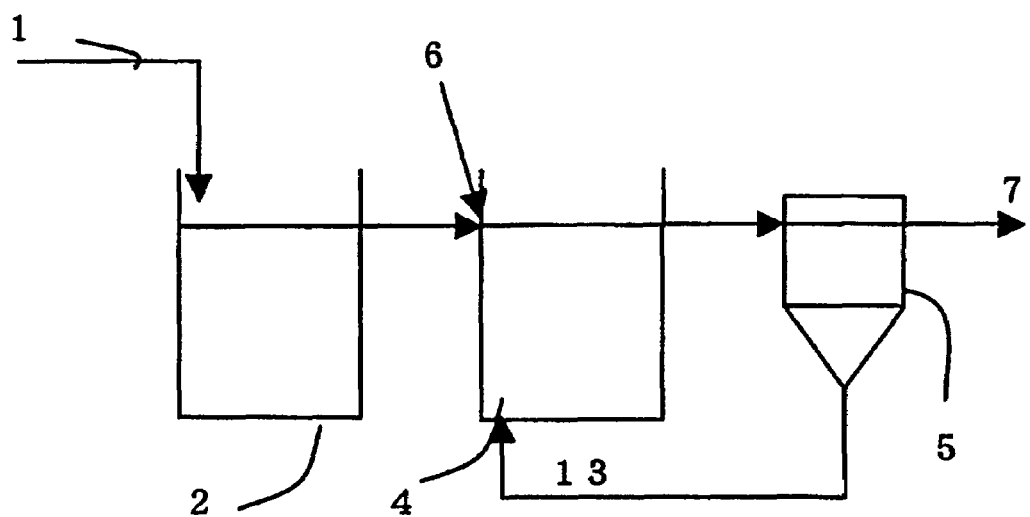
FIG. 1 is a diagram schematically showing a flow used in Example 1.

1 Wastewater
2 Denitrifying tank
3 Nitrifying tank
4 Total oxidization tank
5 Sedimentation tank
6 Coagulant
7 Membrane filtrate or supernatant
8 Return tube from the nitrifying tank
9 Return tube for the membrane filtrate or supernatant
10 Returned sludge
11 Organic matter
12 Membrane filtering apparatus
13 Returned sludge
14 Pump

DESCRIPTION OF THE PREFERRED EMBODIMENTS

Embodiments according to the present invention employ a microorganism-immobilized carrier which is made up of a solid matter having a multiplicity of fine pores, in which microorganisms dwell. Although the microorganism-immobilized carrier may be selected from any known type of microorganism-immobilized carriers, it is preferably in the form of at least one kind selected from the group consisting of a gel carrier, a plastic carrier and a fibrous carrier. The raw material for the carrier may include a vinyl alcohol resin such as polyvinyl alcohol, an ether resin such as polyethylene glycol, an acryl resin such as polymethacrylic acid, acrylamide resin such as polyacrylamide, an olefin resin such as polyethylene or polypropylene, a styrene resin such as polystyrene, an ester resin such as polyethylene terephthalate or polybutylene terephthalate, an acrylonitrile resin such as polyacrylonitrile, an urethane resin such as polyurethane sponge, calcium alginate, κ (kappa) carrageenan, agar, polysaccharide such as cellulose derivatives, polyester acrylate epoxy acrylate, a light-curable resin such as urethane acrylate, a porous inorganic compound such as activated carbon, and so on. Of them, a polyvinyl alcohol hydrated gel, preferably a formalized polyvinyl alcohol type hydrated gel or an acetalized polyvinyl alcohol type hydrated gel can be enumerated in terms of the network structure, in which pores are deployed deep within the gel, and the capability of capturing a substantial amount of water within the gel. In the practice of the present invention, one or a combination of the microorganism-immobilized carriers can be suitably employed. The filling factor thereof is preferably within the range of 5 to 50% of the tank capacity and, more preferably, within the range of 10 to 30% of the tank capacity in terms of the wastewater treating efficiency and the carrier fluidity.

FIG. 1 shows an example of the flow of wastewater treatment according to the present invention. In the illustrated system, in order to reduce the size of an aeration tank as small as possible, a soluble BOD volume load in the aeration tank is of a value preferably equal to or higher than 1 kg/m$^3$*day. The soluble BOD referred to above is a BOD measured after wastewater has been filtered through a membrane filter having a pore size of 0.45 μm and represents a BOD with microorganisms removed from the wastewater (hereinafter referred to as "s-BOD"). The higher the s-BOD volume load, the more the aeration tank can be compactized. By suitably selecting the kind of the carriers and the filling factor, the system can be operated under the volume load of no less than 2 kg/m$^3$*day, or even no less than 5 kg/m$^3$*day.

In the practice of the present invention, the wastewater held in contact with the microorganism-immobilized carrier under an aerobic condition within the aeration tank referred to above is introduced into a total oxidization tank, to which a coagulant is added. Although the kind of the coagulant employed is not always limited to a specific one, any of inorganic or organic coagulants that can be used in the standard wastewater treatment can be equally employed in the present invention. By way of example, examples of the inorganic coagulant include aluminum sulfate, polyaluminum chloride (PAC), ferrous sulfate, ferric sulfate, ferric chloride, chlorinated copperas, sodium aluminate, ammonium alum, potassium alum, calcium hydroxide, calcium oxide, soda ash, sodium carbonate, magnesium oxide, an iron-silica polymer and so on.

Examples of the organic (polymer) coagulant include polyacrylamide, sodium alginate, sodium salt of carboxymethyl cellulose, sodium polyacrylate, maleic acid copolymer, water soluble aniline, polythiourea, polyethyleneimine, quaternary ammonium salt, polyvinyl pyridines, polyoxyethylene, caustic starch and so on.

Addition of the coagulant will not give rises to any flocculating effect when the amount of the coagulant used is too small, and, on the other hand, will result in an excess sludge containing an excessive amount of solid matter, requiring a large amount of the excess sludge to be withdrawn, if the amount thereof is too large. For the addition of the coagulant, an intermittent adding method, in which addition of the coagulant is performed until the settleability is improved and then halted until the settleability worsens, and a continuously adding method, in which a small amount of the coagulant is added at all times, are available.

Depending on a type of the coagulant, the pH range and/or the temperature range that are suitable for flocculation may be specified and/or the pH value will change as a result of addition of the coagulant and, therefore, water quality management suitable for the flocculation such as adjustment of the pH value is preferably performed depending on the necessity.

In the method for the treatment of wastewater containing nitrogen according to the present invention, a flow of removal process of the nitrogen is not specifically limited to particular one. For example, an arrangement of the nitrifying tank followed by the denitrifying tank such as in the Wuhmann method (See, for example, FIGS. 2 and 3.) can be employed. Alternatively, an arrangement of the denitrifying tank followed by the nitrifying tank, in which liquid is returned from the nitrifying tank back to the denitrifying tank with an organic matter such as, for example, methanol added as a source of nutrition for the denitrifying bacteria such as in the Barnard method (See, for example, FIG. 4.) may be employed. Also, a combination of those methods can be contemplated. By way of example, wastewater may be brought into contact with nitrifying bacteria under an aerobic condition within the nitrifying tank with the BOD sludge load of 0.08 kg-BOD/Kg-MLSS*day or lower, so that nitrification and total oxidization for the self-oxidization of the sludge can be carried out within one and the same tank.

In the method for the treatment of wastewater containing nitrogen according to the present invention, although the aerobically treated wastewater within the nitrifying tank is introduced into the total oxidization tank, to which the coagulant is added, the kind of the coagulant employed is not always limited to a specific one and any of inorganic or organic coagulants that can be used in the standard wastewater treatment can be equally employed.

Addition of the coagulant will not give rises to any flocculating effect when the amount of the coagulant used is too small, and, on the other hand, will result in an excess sludge containing an excessive amount of solid matter, requiring a large amount of the excess sludge to be withdrawn, if the amount thereof is too large. For the addition of the coagulant, an intermittent adding method, in which addition of the coagulant is performed until the settleability is improved and then halted until the settleability worsens, and a continuously adding method, in which a small amount of the coagulant is added at all times, are available.

Through the self-oxidization of the microorganisms within the total oxidization tank, microorganism-derived nitrate nitrogen and/or nitrite nitrogen are generated and will flow together with a treated water out from the sedimentation tank. In order to reduce the amount of the nitrate nitrogen and/or nitrite nitrogen, the treated water may be returned to the denitrifying tank.

Also, the separation membrane, which can be employed in the practice of the method for treating wastewater, containing nitrogen, in accordance with the present invention may not be always limited to that having a specific shape, but may be selected from the group consisting of a hollow fiber membrane, a tubular membrane and a flat membrane. Specifically, the use of the hollow fiber membrane is particularly advantageous in that it has a large surface area of the membrane for unitary membrane capacity and, therefore, a filtering apparatus as a whole can be manufactured compact in size.

Material used to form the separation membrane may also not be limited always to a specific one, but depending on the condition of use and/or the desired filtering performance, either a separation membrane made of an organic polymer material including, for example, polyolefin, polysulfone, polyethersulfone, ethylene-vinyl alcohol copolymer, polyacrylonitrile, cellulose acetate, polyvinylidene fluoride, polyperfluoroethylene, polyester metacrylate, polyester and polyamide, or a separation membrane made of an inorganic material such as ceramics, can be used. Although the use of a hydrophilic material such as a polysulfone resin which has been hydrophilized with a polyvinyl alcohol type resin, a polysulfone resin which has been added with a hydrophilic polymer, a polyvinyl alcohol resin, a polyacrylonitrile resin, a cellulose acetate resin, a polyethylene resin which has been hydrophilized, or the like is preferred because of its high hydrophilic property sufficient to minimize adherence of SS components and to enhance separation of adhered SS components, the hollow fiber membrane made of any other suitable material can also be employed. Where the organic polymer type material is used, a copolymer of a plurality of compositions or a mixture of a plurality of materials may be employed.

Where the organic polymer material is used as a raw material for the separation membrane, a manufacturing method is not always limited to a particular method, but any known manufacturing method can be selected and employed in consideration of characteristics of the raw material and the desired shape and performance of the separation membrane.

The separation membrane that is used in the practice of the present invention has a pore size preferably within the range of 0.1 to 5 µm and, more preferably, within the range of 0.2 to 3 µm, in consideration of the function of separation between the sludge and water. The pore size referred to hereinbefore and hereinafter is defined as a particle size of a particular standard material at which particle size 90% of the particles of the standard material is eliminated by filtering of the separation membrane. The standard material has a known particle size and may be selected from various materials such as colloidal silica, emulsions, and latex.

In the practice of the present invention, the separation membrane is assembled in a module and is then used for filtration. The membrane module may take any suitable configuration depending on a shape of the separation membrane, a filtering method, filtering conditions and a cleansing method and one or a plurality of membrane elements may be mounted or charged to form a hollow fiber membrane module. By way of example, the membrane module may take a configuration, in which several tens to some ten thousands of hollow fiber membranes are bundled together and are then charged into a module in a generally U-shaped fashion, in which one end of the bundle of the hollow fibers is sealed by a suitable sealing member, in which respective ends of the bundled hollow fibers are sealed by suitable sealing members in a non-fixed fashion (in a free state), and in which opposite ends of the bundled hollow fibers are left open. The shape of the module is also not specifically limited to a particular one and may be either cylindrical or screen-shape.

The separation membrane is generally susceptible to clogging, which causes reduction in filtering performance, but can be regenerated when physically or chemically cleansed. The condition for regeneration may be suitably selected depending on the type of raw material used to form the separation membrane module, and the shape and pore size thereof, either a physical cleansing method or a chemical cleansing method can be suitably employed. The physical cleaning method may include, for example, filtrate water backwashing, gas backwashing, flushing, air bubbling or the like, whereas the chemical cleansing method may include, for example, cleansing with an acid such as, for example, hydrochloric acid, sulfuric acid, nitric acid, oxalic acid or citric acid, cleansing with an alkaline such as sodium hydroxide, cleansing with an oxidizing agent such as sodium hypochlorite or hydrogen peroxide, cleansing with a chelating agent such as ethylenediamine tetra acetic acid, or the like.

Figure 5:
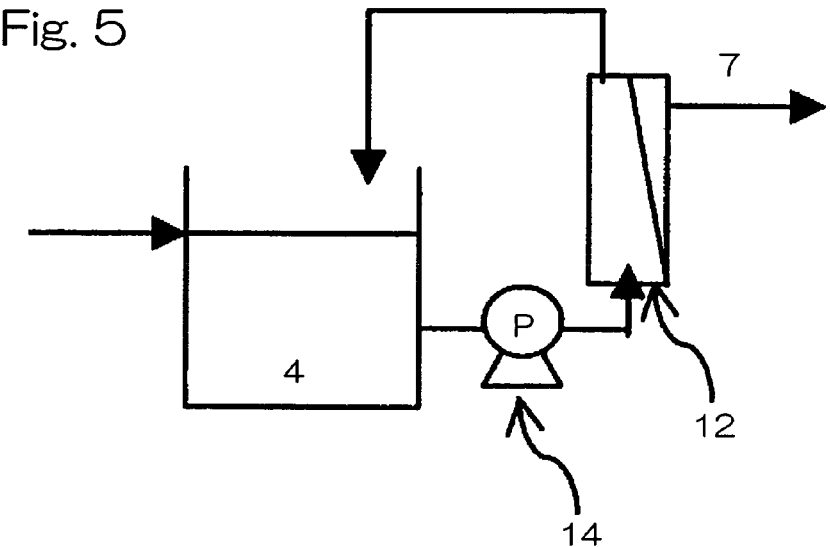
FIG. 5 illustrates one example of the manner of installation of a separation membrane.
Figure 6:
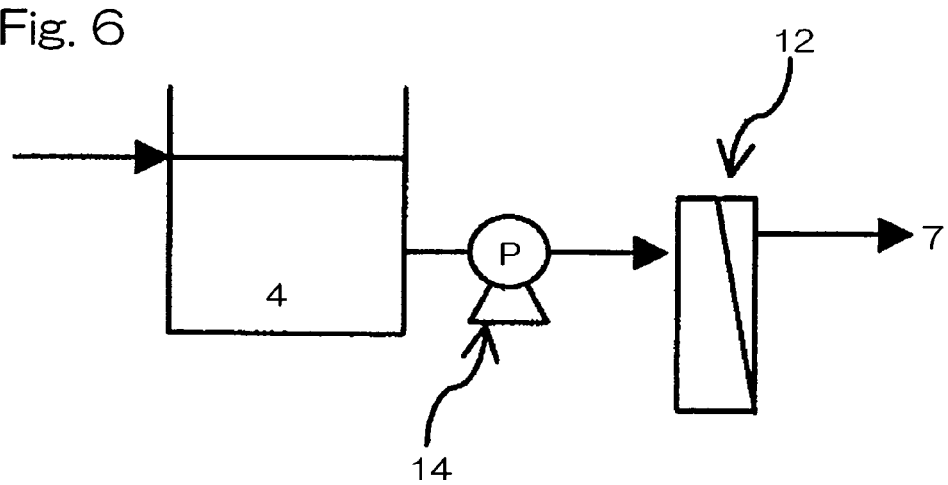
FIG. 6 illustrates another example of the manner of installation of the separation membrane.
Figure 7:
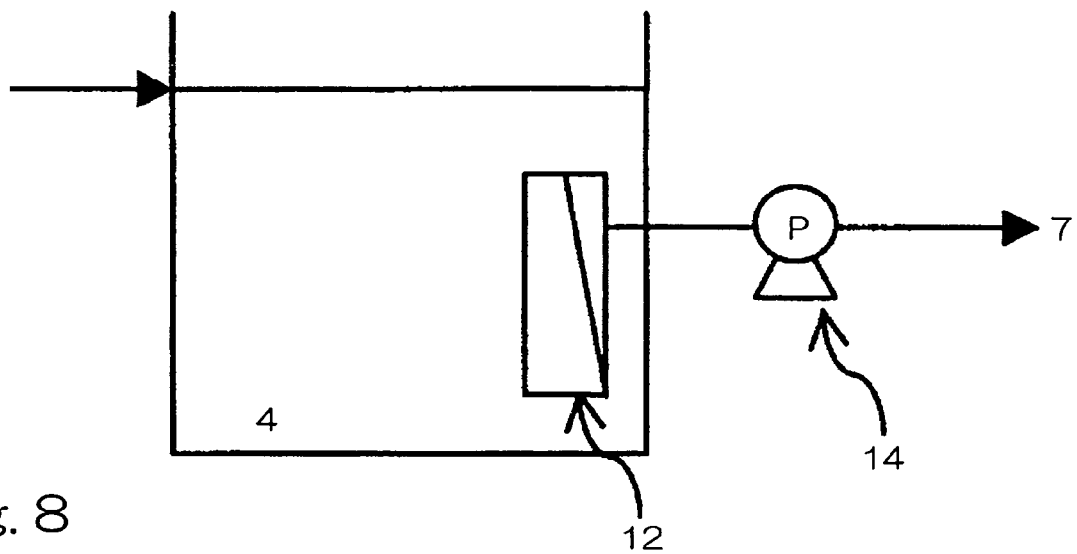
FIG. 7 illustrates a further example of the manner of installation of the separation membrane.

FIGS. 5 to 7 show examples of setup of the separation membrane and exemplary structures of the membrane filtering apparatus, which can be employed in the practice of the present invention. As a filtering system, a system in which as shown in FIG. 5, the membrane module or the like including the separation membrane is installed outside the total oxidization tank and a part of an unfiltered water containing sludge is filtered while the unfiltered water is circulated, a system in which as shown in FIG. 6, the membrane module or the like including the separation membrane is installed outside the total oxidization tank so that an unfiltered water containing sludge can be supplied to the membrane module to allow the total amount of the raw water to be filtered, and a system in which as shown in FIG. 7, the membrane module or the like including the separation membrane is submerged within the total oxidization tank so that suction filtration may take place, can be enumerated. Also, depending on the arrangement of the total oxidization tank and the membrane module, a water level difference can be utilized in place of a booster pump or a suction pump. It is to be noted that in the system such as shown in FIG. 5, although such an advantage can be appreciated that the system can be generally operated under a high permeate flux and the membrane surface area may be small, a large amount of energies are required to circulate the unfiltered water containing the sludge. On the other hand, although the system such as shown in FIG. 7 has such an advantage that the space for installation and the energy may be small, the permeate flux is generally low and a large membrane surface area is required. Also, where the system, in which the separation membrane is submerged within the total oxidization tank so that filtration may take place by the utilization of the suction force or the water level difference as shown in FIG. 6, is employed, the membrane module including the separation membrane may be disposed above an air diffusing device so that by the utilization of an effect of cleansing membrane surface with diffused air, clogging of the membrane pores can be suppressed. While a new wastewater treatment facility may be set up for the purpose of the present invention, any existing wastewater treatment facility if renovated may be employed.

EXAMPLES

Hereinafter, the present invention will be described in detail by way of demonstration of various examples.

Example 1

In accordance with the flow shown in FIG. 1, using the wastewater treatment apparatus including the carrier fluidizing aeration tank of 320 $m^3$ in capacity, the total oxidization tank of 240 $m^3$ in capacity and the sedimentation tank of 50 $m^3$ in capacity, chemical wastewater was treated in a quantity of 400 $m^3$ per day. 32 $m^3$ of acetalized polyvinyl alcohol gel carrier (about 4 mm in diameter) was charged into the carrier fluidizing aeration tank. Also, 10 mg/L of polyaluminum chloride (an inorganic coagulant) was added to the wastewater which has been treated in the carrier fluidizing tank. When based on the teachings of the present invention, the system was operated with the BOD capacity load of the carrier fluidizing aeration tank set to 2.5 kg/$cm^3$*day, the MLSS within the total oxidization tank increased gradually, but when the BOD sludge load became 0.05 kg-BOD/kg-MLSS*day, the MLSS within the total oxidization tank took a substantially constant value of about 10,000 mg/L.

After the coagulant was continuously supplied for about one month subsequent to the start of operation, no coagulant was added and the system was able to operated for about one month without the sludge withdrawal. The MLSS within the total oxidization tank at this time increased slightly to 10,100 mg/L. Although in view of the fact that the MLSS increases slightly, it appears that a portion of the sludge is required to be withdrawn once a few years, a considerable reduction of the excess sludge can be achieved. The rate of generation of the excess sludge during one month was about 1% relative to the BOD quantity of the raw water. The BOD of the treated water at this time was not greater than 5 mg/L, resulting in a favorably treated water containing SS in a quantity smaller than about 20 mg/L.

Comparative Example 1

Figure 8:
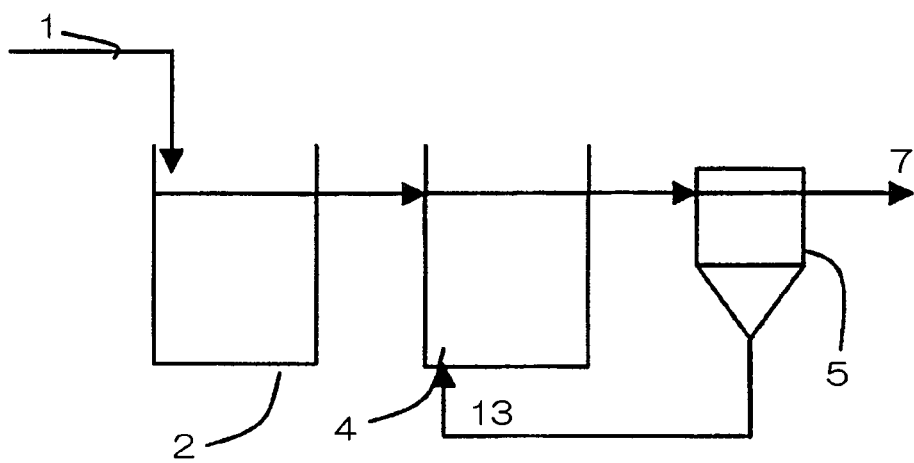
FIG. 8 is a diagram schematically showing a flow used in Comparative Example 1.

In accordance with the flow shown in FIG. 8, using the tanks each having the equal capacity, drainage volume and drainage load to those in the Example 1, an experiment was conducted to treat wastewater without the coagulant used and with the s-BOD sludge load of the total oxidization tank set to 0.05 Kg-BOD/Kg-MLSS*day. As a result, the sludge was dispersed and did not separate within the sedimentation tank, resulting in reduction of the concentration of the returned sludge down to about 700 mg/L with the MLSS within the total oxidization tank exhibiting about 600 mg/L. Also, the BOD of the treated water was about 300 mg/L and the SS was about 600 mg/L, both of which was considerably bad.

Comparative Example 2

Figure 9:
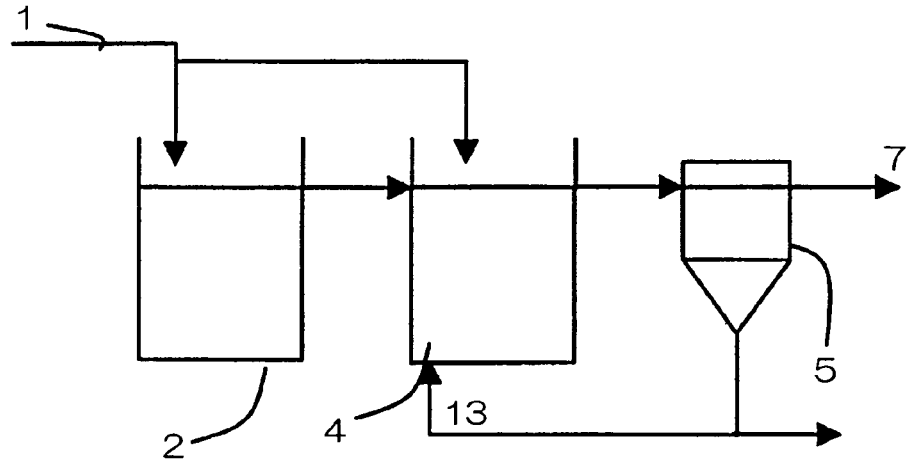
FIG. 9 is a diagram schematically showing a flow used in Comparative Example 2.

In accordance with the flow shown in FIG. 9, using the tanks each having the equal capacity, drainage volume and drainage load to those in Example 1 and, also, using the total oxidization tank used in the Example 1 for an activated sludge tank, an experiment was conducted to treat wastewater without the coagulant used and with a portion of the raw water separately injected into the activated sludge tank so that the s-BOD sludge load of the activated sludge tank can be set to 0.15 Kg-BOD/Kg-MLSS*day in order to obtain a sludge having a good settleability. As a result of this operation performed continuously for about two months, the MLSS within the activated sludge tank was running at about 3,500 mg/L, showing a sludge having a good settleability. Also, the s-BOD sludge load within the activated sludge tank was 0.10 to 0.15 Kg-BOD/Kg-MLSS*day. The BOD of the treated water was not greater than 10 mg/L and the SS thereof was not greater than about 20 mg/L, showing a good condition. The rate of generation of the excess sludge was about 15% relative to the BOD quantity of the raw water. Also, since the sludge interface within the sedimentation tank rises day by day, daily withdrawal of the sludge was required.

Comparative Example 3

Figure 10:
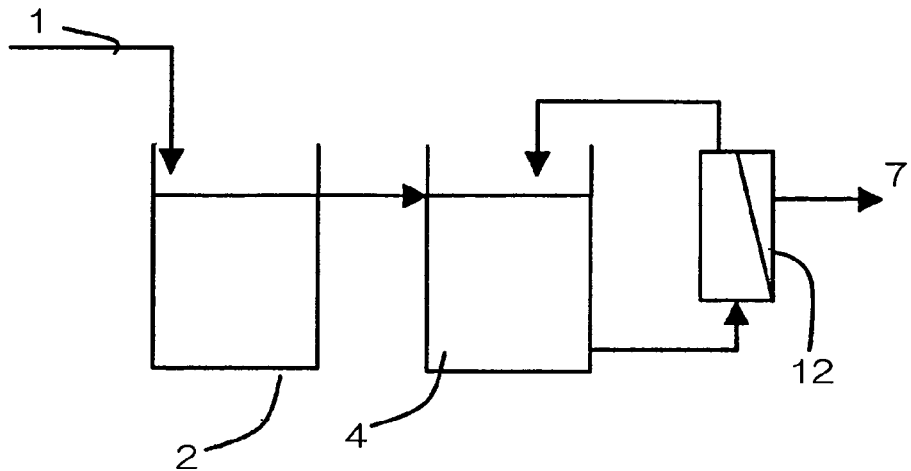
FIG. 10 is a diagram schematically showing a flow used in Comparative Example 3.

In accordance with the flow shown in FIG. 10, using the carrier fluidizing tank and the total oxidization tank, each having the equal tank capacity, drainage volume and drainage load to those in Example 1, and, also, using the total oxidization tank provided with a membrane filtering apparatus, an experiment was conducted to treat wastewater, with no coagulant used and the filtrate water being discharged as a treated water. The MLSS within the total oxidization tank increased gradually subsequent to the start of the experiment, but when the BOD sludge load became 0.05 kg-BOD/kg-MLSS*day, the MLSS within the total oxidization tank took a substantially constant value of about 10,000 mg/L. Thereafter, when the system was operated for one month with no sludge withdrawal taking place, the MLSS within the total oxidization tank became about 10,100 mg/L. At this time, the BOD of the treated water was not greater than 5 mg/L and the SS was 0 mg/L. However, in order to filtrate 400 m$^3$ per day of wastewater, 12 pieces of hollow fiber membrane of 33 m$^2$ are required, resulting in the running cost which is about five times that required when the coagulant would have been added.

Example 2

Figure 2:
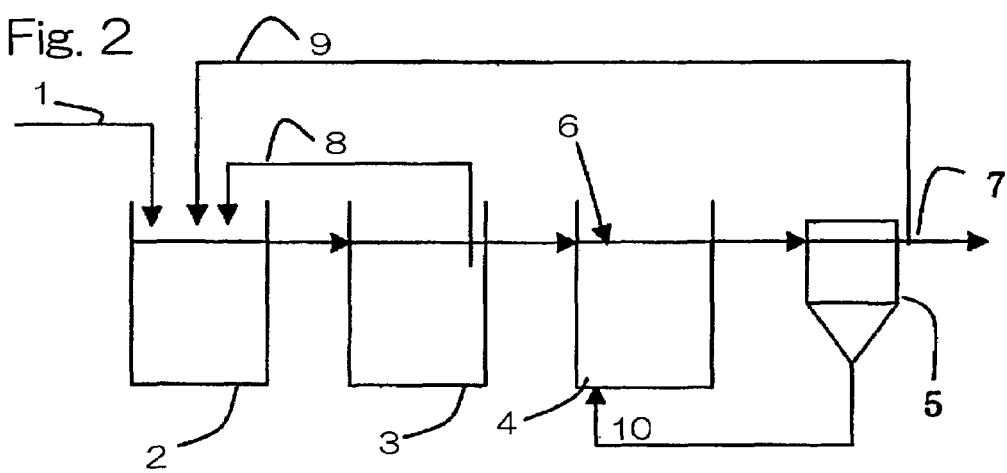
FIG. 2 is a diagram schematically showing a flow used in Example 2.

In accordance with the flow shown in FIG. 2, using the wastewater treatment apparatus including the denitrifying tank of 30 m$^3$ in capacity, the nitrifying tank of 30 m$^3$ in capacity, the total oxidization tank of 25 m$^3$ in capacity and the sedimentation tank of 25 m$^3$ in capacity, chemical wastewater containing 50 mg/L of ammonia nitrogen was treated in a condition, in which, BOD is 200 mg/L and a drainage volume is 200 m$^3$/day. 3.3 m$^3$ of acetalized polyvinyl alcohol gel carrier (about 4 mm in diameter) was charged into each of the denitrifying tank and the nitrifying tank and the wastewater was returned from the nitrifying tank to the denitrifying tank at a rate of 600 m$^3$ per day. Also, 10 mg/L of polyaluminum chloride (an inorganic coagulant) was added to the wastewater which has been treated in the nitrifying tank. In addition, the wastewater was returned from a discharge port of the sedimentation tank to the denitrifying tank at a rate of 600 m$^3$ per day. When based on the teachings of the present invention, the system was operated with the nitrogen capacity load of each of the denitrifying tank and the nitrifying tank set to 0.3 kg/cm3*day, the MLSS within the total oxidization tank increased gradually, but when the BOD sludge load became 0.05 kg-BOD/kg-MLSS*day, the MLSS within the total oxidization tank took a substantially constant value of about 5,000 mg/L. After the coagulant was continuously supplied for about one month subsequent to the start of the operation, no coagulant was added and the system was operated for about one month without the sludge withdrawal. The MLSS within the total oxidization tank at this time increased slightly to 5,050 mg/L. Although in view of the fact that the MLSS increases slightly, it appears that a portion of the sludge is required to be withdrawn once a few years, a considerable reduction of the excess sludge can be achieved. The rate of generation of the excess sludge during one month was about 1% relative to the BOD quantity of the raw water. The total nitrogen contained in the treated water at this time was not greater than 12.5 mg/L, the BOD was not greater than 5 mg/L and the SS was not greater than about 20 mg/L, resulting in a favorably treated water.

Example 3

Figure 3:
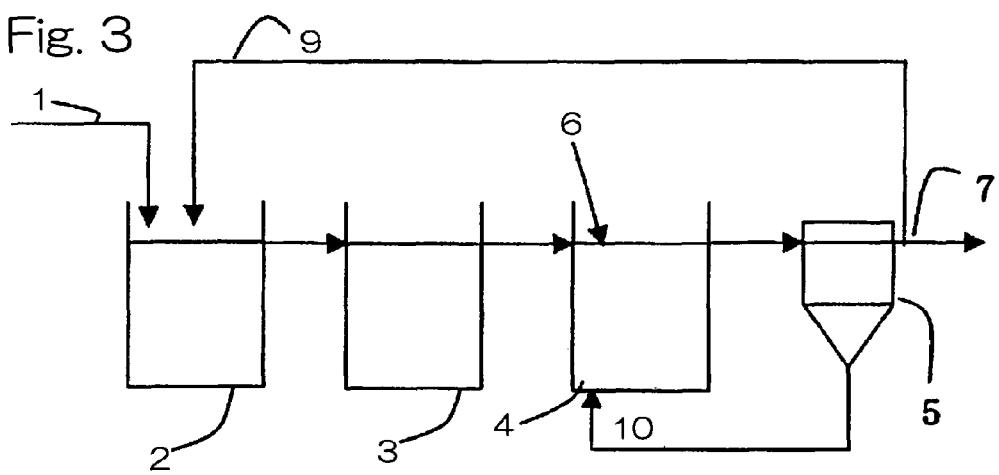
FIG. 3 is a diagram schematically showing a flow used in Example 3.
Figure 4:
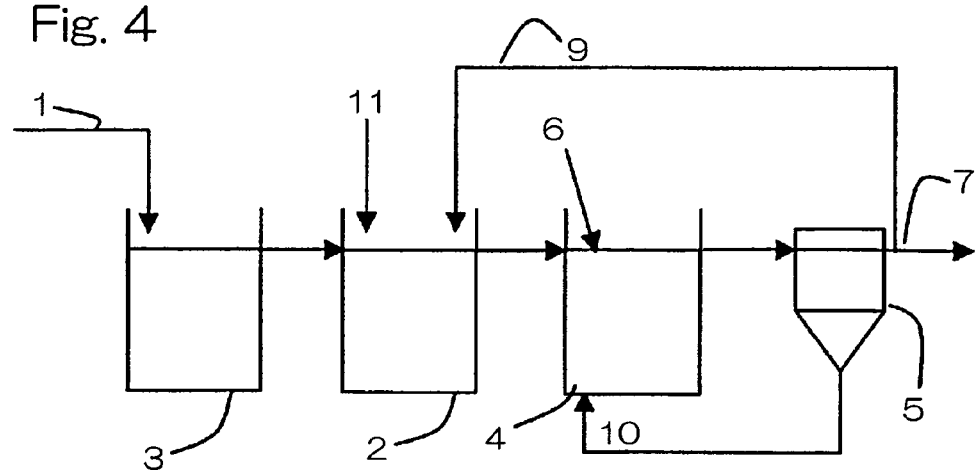
FIG. 4 is a diagram schematically showing a flow used in Example 4.

In accordance with the flow shown in FIG. 3, using the wastewater treatment apparatus including the denitrifying tank of 270 m$^3$ in capacity, the nitrifying tank of 270 m$^3$ in capacity, the total oxidization tank of 100 m$^3$ in capacity and the sedimentation tank of 250 m$^3$ in capacity, chemical wastewater containing 40 mg/L of ammonia nitrogen was treated in a condition, in which BOD is 160 mg/L and a drainage volume is 2,000 m$^3$ per day. 27 m$^3$ of acetalized polyvinyl alcohol type gel carrier (about 4 mm in diameter) was charged into each of the denitrifying tank and the nitrifying tank. The wastewater was returned from a discharge port of the sedimentation tank to the denitrifying tank at a rate of 6,000 m$^3$ per day. When based on the teachings of the present invention, the system was operated with the nitrogen capacity load of each of the denitrifying tank and the nitrifying tank set to 0.3 kg/cm3*day, the MLSS within the total oxidization tank increased gradually, but when the BOD sludge load became 0.05 kg-BOD/kg-MLSS*day, the MLSS within the total oxidization tank took a substantially constant value of about 10,000 mg/L. After the coagulant was continuously supplied for about one month subsequent to the start of the operation, no coagulant was added and the system was operated for about one month and half without the sludge withdrawal. The MLSS within the total oxidization tank at this time increased slightly to 10,150 mg/L. Although in view of the fact that the MLSS increases slightly, it appears that a portion of the sludge is required to be withdrawn once a few years, a considerable reduction of the excess sludge can be achieved. The rate of generation of the excess sludge during one month and half was about 1% relative to the BOD quantity of the raw water. The total nitrogen contained in the treated water at this time was not greater than 10 mg/L, the BOD was not greater than 5 mg/L and the SS was not greater than about 20 mg/L, resulting in a favorably treated water.

Example 4

In accordance with the flow shown in FIG. 2, using the wastewater treatment apparatus including the denitrifying tank of 270 m$^3$ in capacity, the nitrifying tank of 270 m$^3$ in capacity, the total oxidization tank of 100 m$^3$ in capacity and the sedimentation tank of 250 m$^3$ in capacity, chemical wastewater containing 40 mg/L of ammonia nitrogen was treated in a condition in which a drainage volume is 2,000 m$^3$/day. 27 m$^3$ of acetalized polyvinyl alcohol type gel carrier (about 4 mm in diameter) was charged into each of the denitrifying tank and the nitrifying tank and 24 Kg/day of methanol was added to the denitrifying tank. Also, 10 mg/L of aluminum sulfate (an inorganic coagulant) was added to the wastewater which has been treated in the nitrifying tank. In addition, the wastewater was returned from a discharge port of the sedimentation tank to the denitrifying tank at a rate of 6,000 m$^3$/day. When based on the teachings of the present invention, the system was operated with the nitrogen capacity load of each of the nitrifying tank and the denitrifying tank set to 0.3 kg/cm3*day, the MLSS within the total oxidization tank increased gradually, but when the BOD sludge load became 0.05 kg-BOD/kg-MLSS*day, the MLSS within the total oxidization tank took a substantially constant value of about 10,000 mg/L. After the coagulant was continuously supplied for about one month subsequent to the start of the operation, no coagulant was added and the system was operated for about one month and half without the sludge withdrawal. The MLSS within the total oxidization tank at this time increased slightly to 10,150 mg/L. Although in view of the fact that the MLSS increases slightly, it appears that a portion of the sludge is required to be withdrawn once a few years, a considerable reduction of the excess sludge can be achieved. The rate of generation of the excess sludge during one month and half was about 1% relative to the BOD quantity of the raw water. The total nitrogen contained in the treated water at this time was not greater than 10 mg/L, the BOD was not greater than 5 mg/L and the SS was about not greater than 20 mg/L, resulting in a favorably treated water.

Comparative Example 4

Figure 11:
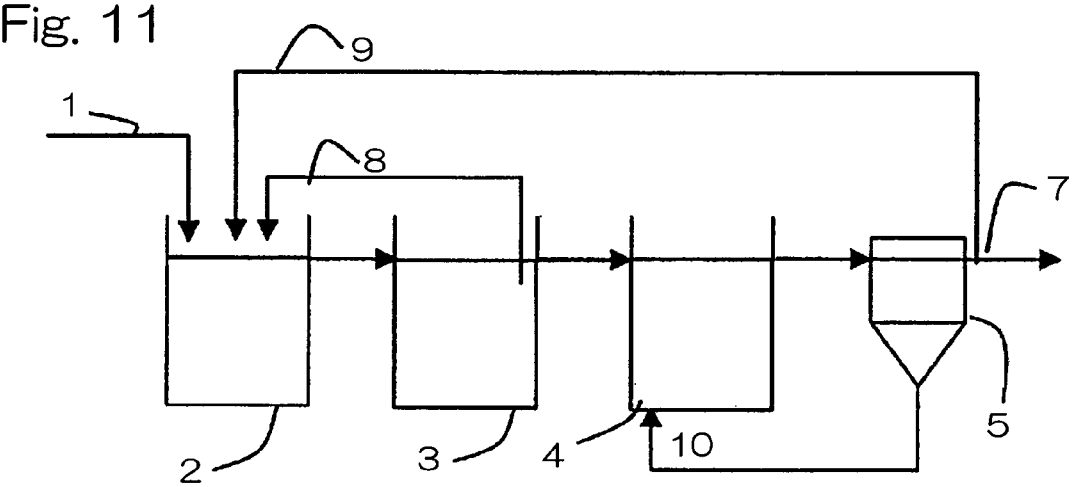
FIG. 11 is a diagram schematically showing a flow used in Comparative Example 4.

In accordance with the flow shown in FIG. 11, using the tanks each having the equal capacity, drainage volume and drainage load to those in Example 2, an experiment was conducted to treat wastewater, without the coagulant added and with the s-BOD sludge load of the total oxidization tank set to 0.05 Kg-BOD/Kg-MLSS*day. As a result, the sludge was dispersed and did not separate within the sedimentation tank, resulting in reduction of the concentration of the returned sludge down to about 700 mg/L with the MLSS within the total oxidization tank exhibiting about 600 mg/L. Also, the total nitrogen contained in the treated water was about 90 mg/L, the BOD of the treated water was about 300 mg/L and the SS was about 600 mg/L, and the treated water was thus considerably bad.

Comparative Example 5

Figure 12:
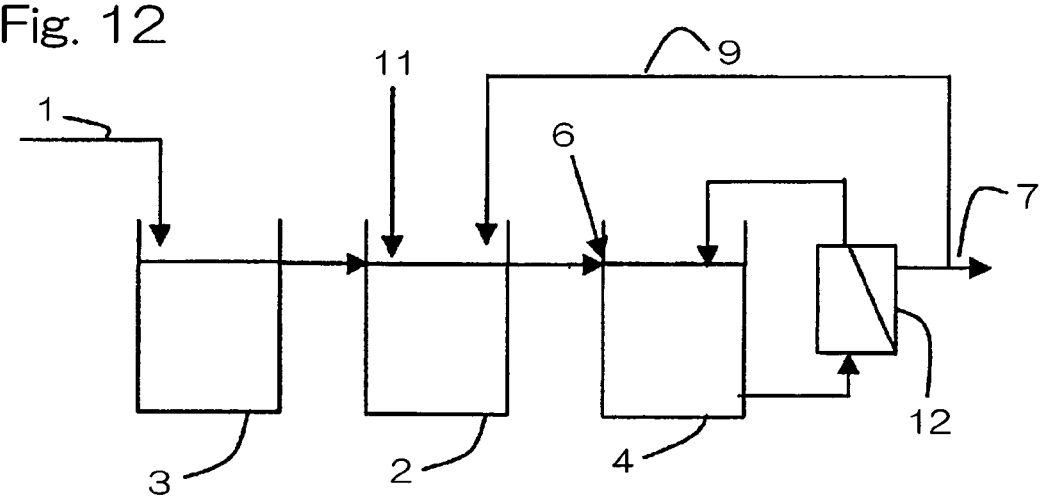
FIG. 12 is a diagram schematically showing a flow used in Comparative Example 5.

In accordance with the flow shown in FIG. 12, using the nitrifying tank, the denitrifying tank and the total oxidization tank, each having the equal tank capacity, drainage volume and drainage load to those in Example 4, and, also, using the total oxidization tank provided with a membrane filtering apparatus, an experiment was conducted to treat wastewater, with no coagulant used, and the filtrate water being discharged as a treated water. The MLSS within the total oxidization tank increased gradually subsequent to the start of the experiment, but when the BOD sludge load became 0.05 kg-BOD/kg-MLSS*day, the MLSS within the total oxidization tank took a substantially constant value of about 10,000 mg/L. Thereafter, when the system was operated for one month with no sludge withdrawal taking place, the MLSS within the total oxidization tank became about 10,100 mg/L. At this time, the total nitrogen contained in the treated water was not greater than 10 mg/L, the BOD of the treated water was not greater than 5 mg/L and the SS was 0 mg/L. However, in order to filtrate 2,000 m³ per day of wastewater, 60 pieces of hollow fiber membranes of 33 m² are required, resulting in the running cost which is about five times that required when the coagulant would have been added.

Example 5

Figure 13:
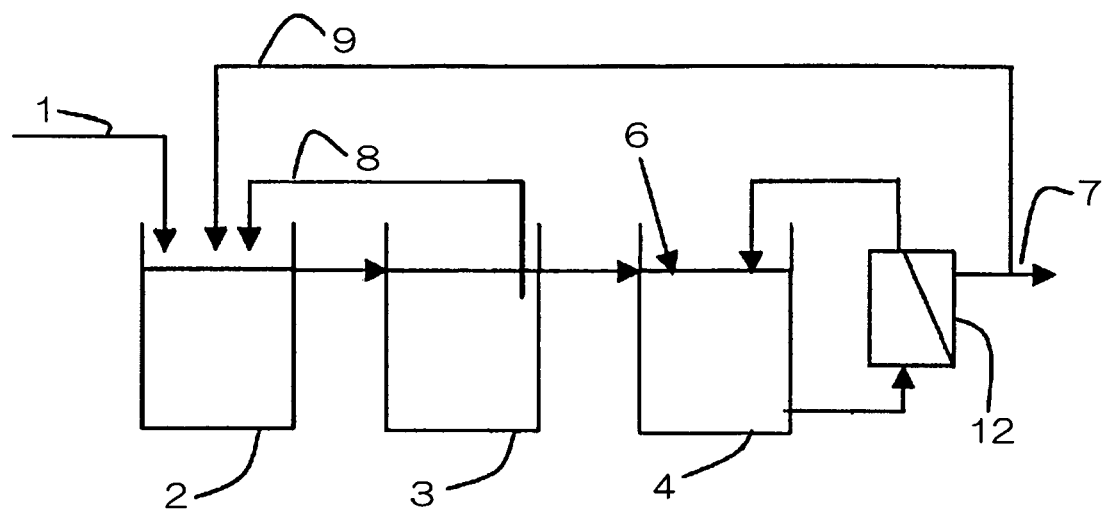
FIG. 13 is a diagram schematically showing a flow used in Example 5.

In accordance with the flow shown in FIG. 13, using the wastewater treatment apparatus including the denitrifying tank of 30 m³ in capacity, the nitrifying tank of 30 m³ in capacity, the total oxidization tank of 25 m³ in capacity and the membrane filtering apparatus of 25 m³ in capacity, wastewater containing 50 mg/L of ammonia nitrogen was treated in a condition in which BOD in a quantity is 200 mg/L and a drainage volume is 200 m³ per day. 3.3 m³ of acetalized polyvinyl alcohol type gel carrier (about 4 mm in diameter) was charged into each of the denitrifying tank and the nitrifying tank and the wastewater was returned from the nitrifying tank to the denitrifying tank through a return tube at a rate of 600 m³/day. Also, 10 mg/L of polyaluminum chloride (an inorganic coagulant) was added to the wastewater which has been treated in the nitrifying tank. In addition, a portion of the filtrate water was returned to the denitrifying tank at a rate of 600 m³ per day through a return tube for the filtrate water. For the separation membrane, a hollow fiber membrane of 2 μm in pore size was used. When based on the teachings of the present invention, the system was operated with the nitrogen capacity load of each of the denitrifying tank and the nitrifying tank set to 0.3 kg/cm3*day, the MLSS within the total oxidization tank increased gradually, but when the BOD sludge load became 0.05 kg-BOD/kg-MLSS*day, the MLSS within the total oxidization tank took a substantially constant value of about 5,000 mg/L. After the coagulant was continuously supplied for about one month subsequent to the start of the operation, no coagulant was added and the system was operated for about one month without the sludge withdrawal. The MLSS within the total oxidization tank at this time increased slightly to 5,050 mg/L. Although in view of the fact that the MLSS increases slightly, it appears that a portion of the sludge is required to be withdrawn once a few years, a considerable reduction of the excess sludge can be achieved. The rate of generation of the excess sludge during one month was about 1% relative to the BOD quantity of the raw water. The total nitrogen contained in the treated water at this time was not greater than 12.5 mg/L, the BOD was not greater than 5 mg/L and the SS was about 0 mg/L, resulting in a favorably treated water. Also, the amount of the filtrate water per 1 m² of the separation membrane was 5 m³/day.

Comparative Example 6

Figure 14:
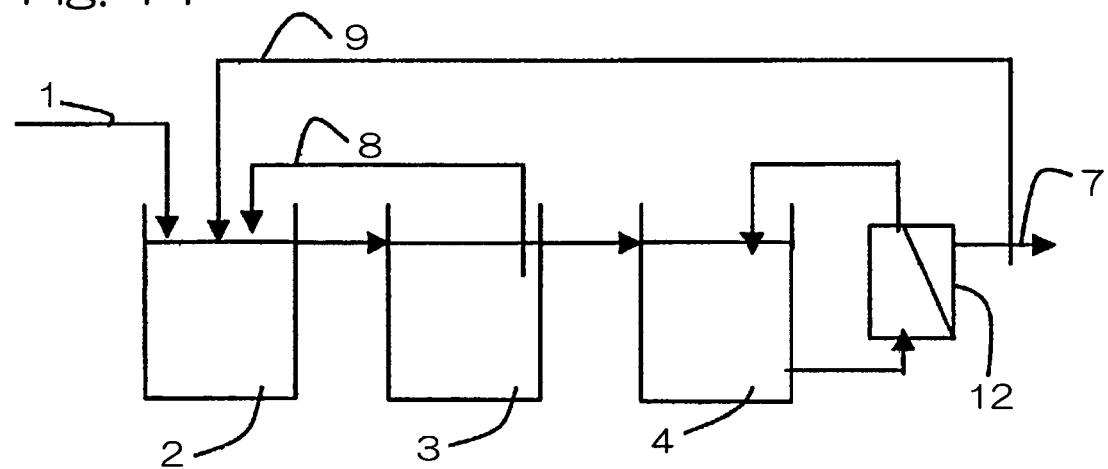
FIG. 14 is a diagram schematically showing a flows used in Comparative Example 6 and Example 7.

In accordance with the flow shown in FIG. 14, using the tanks each having the equal capacity, pore size of the separation membrane, drainage volume and drainage load to those in Example 5, an experiment was conducted to treat wastewater, without the coagulant added and with the s-BOD sludge load of the total oxidization tank set to 0.05 Kg-BOD/Kg-MLSS*day or less. As a result, the sludge was dispersed and the filtering surface of the separation membrane was immediately clogged, resulting in the system failure to operate with no treated water obtained.

Comparative Example 7

In accordance with the flow shown in FIG. 14, using the tanks each having the equal capacity, drainage volume and drainage load to those in Example 5, and also using the separation membrane of 0.005 μm in pore size, an experiment was conducted to treat wastewater, without the coagulant added. The MLSS within the total oxidization tank increased gradually subsequent to the start of operation, but when the BOD sludge load became 0.05 kg-BOD/kg-MLSS*day, the MLSS within the total oxidization tank took a substantially constant value of about 5,000 mg/L. The BOD of the treated water was not greater than 5 mg/L and the SS was about 0 mg/L. However, the amount of the filtrate water per 1 m² of the separation membrane was 1 m³/day, which required the membrane surface area that is about 5 times that required when the coagulant would have been used and the separation membrane of 2 μm in pore size would have been used.

What is claimed is:
1. A wastewater treatment method with minimized excess sludge withdrawal, which comprises:
   an aeration step of contacting wastewater with a microorganism-immobilized carrier under an aerobic condition within an aeration tank;
   a total oxidization step of self-oxidizing a sludge under an aerobic condition within a total oxidization tank with a BOD sludge load set to 0.08 kg-BOD/Kg-MLSS*day or smaller; and
   a sedimentation step of sedimenting the sludge generated in the total oxidization tank and introduced into a sedimentation tank directly from the total oxidization tank, within the sedimentation tank; the steps being sequentially performed in this order;
wherein a coagulant is added to the total oxidization tank.

2. The wastewater treatment method of claim 1, wherein the microorganism-immobilized carrier is selected from the group consisting of a gel carrier, a plastic carrier and a filamentous carrier.

3. The wastewater treatment method of claim 2, wherein the microorganism-immobilized carrier is an acetalized polyvinyl alcohol gel.

4. The wastewater treatment method of claim 1, wherein the BOD sludge load within the total oxidization tank is 0.05 kg-BOD/Kg-MLSS*day or smaller.

5. A nitride-containing wastewater treatment method with minimized excess sludge withdrawal,
(i) which comprises:
an nitrification step of contacting wastewater with nitrifying bacteria under an aerobic condition within a nitrification tank;
a denitrification step of contacting the wastewater with denitrifying bacteria under an anaerobic condition within a denitrification tank;
a total oxidization step of self-oxidizing a sludge under an aerobic condition within a total oxidization tank with a BOD sludge load set to 0.08 kg-BOD/Kg-MLSS*day or smaller; and
a sedimentation step of separating between the sludge generated in the total oxidization tank and introduced into a sedimentation tank directly from the total oxidization tank, and non-sludge components of a treated wastewater;
wherein a coagulant is added during the total oxidization step; or
(ii) which comprises:
a denitrification step of contacting wastewater with denitrifying bacteria under an anaerobic condition within a denitrification tank:
an nitrification and total oxidization step of contacting the wastewater with nitrifying bacteria under an aerobic condition within a nitrification tank with a BOD sludge load set to 0.08 kg-BOD/Kg-MLSS*day or smaller to self-oxidize the sludge; and
a sedimentation step of separating between the sludge generated in the total oxidization tank and introduced into a sedimentation tank directly from the total oxidization tank and the non-sludge components of a treated wastewater within a sedimentation tank;
wherein a coagulant is added during the nitrification and total oxidization step.

6. The nitrogen-containing wastewater treatment method of claim 5 with minimized excess sludge withdrawal, (ii) which comprises:
a denitrification step of contacting wastewater with denitrifying bacteria under an anaerobic condition within a denitrification tank:
an nitrification and total oxidization step of contacting the wastewater with nitrifying bacteria under an aerobic condition within a nitrification tank with a BOD sludge load set to 0.08 kg-BOD/Kg-MLSS*day or smaller to self-oxidize the sludge; and
a sedimentation step of separating between the sludge generated in the total oxidization tank and introduced into a sedimentation tank directly from the total oxidization tank and the non-sludge components of a treated wastewater within a sedimentation tank;
wherein a coagulant is added during the nitrification and total oxidization step.

7. The nitrogen-containing waste treatment method claim 5, wherein within at least one of the nitrification tank, the denitrification tank and the total oxidization tank, a microorganism-immobilized carrier with which the bacteria are immobilized, is used.

8. The nitrogen-containing waste treatment method as claimed in claim 7, wherein the microorganism-immobilized carrier is selected from the group consisting of a gel carrier, a plastic carrier and a filamentous carrier.

9. The nitrogen-containing wastewater treatment method as claimed in claim 8, wherein the microorganism-immobilized carrier is an acetalized polyvinyl alcohol gel.

10. The nitrogen-containing wastewater treatment method as claimed in claim 5, wherein the BOD sludge load within the total oxidization tank is 0.05 kg-BOD/Kg-MLSS*day or smaller.

11. The nitrogen-containing wastewater treatment method of claim 5 with minimized excess sludge withdrawal (i) which comprises:
a nitrification step of contacting wastewater with nitrifying bacteria under an aerobic condition within a nitrification tank;
a denitrification step of contacting the wastewater with denitrifying bacteria under an anaerobic condition within a denitrification tank;
a total oxidization step of self-oxidizing a sludge under an aerobic condition within a total oxidization tank with a BOD sludge load set to 0.08 kg-BOD/Kg-MLSS*day or smaller; and
a sedimentation step of separating between the sludge generated in the total oxidization tank and introduced into a sedimentation tank directly from the total oxidization tank, and non-sludge components of a treated wastewater;
wherein a coagulant is added during the total oxidization step.

12. A wastewater treatment method with minimized excess sludge withdrawal,
(i) which comprises:
an nitrification step of contacting wastewater with nitrifying bacteria under an aerobic condition within a nitrification tank;
a denitrification step of contacting the wastewater with denitrifying bacteria under an anaerobic condition within a denitrification tank;
a total oxidization step of self-oxidizing a sludge under an aerobic condition with a BOD sludge load set to 0.08 kg-BOD/Kg-MLSS*day or smaller; and
a filteration step of filtering the sludge, generated in the total oxidization tank and introduced directly from the total oxidization tank, with a separation membrane having a pore size within the range of 0.1 to 5 µm, the steps being sequentially performed in this order;
wherein a coagulant is added during the total oxidization step; or
(ii) which comprises:
a denitrification step of contacting wastewater with denitrifying bacteria under an anaerobic condition within a denitrification tank;
a nitrification and total oxidization step of contacting the wastewater with nitrifying bacteria under an aerobic condition within a nitrification tank with a BOD sludge load set to 0.08 kg-BOD/Kg-MLSS*day or smaller to self-oxidize the sludge; and
a filteration step of filtering the sludge, generated in the total oxidization tank and introduced directly from the total oxidization tank, with a separation membrane having a pore size within a range of 0.1 to 5 µm, the steps being sequentially performed in this order;
wherein a coagulant is added during the nitrification and total oxidization step.

13. The nitrogen-containing wastewater treatment method of claim 12 with minimized excess sludge withdrawal, (ii) which comprises:
- a denitrification step of contacting wastewater with denitrifying bacteria under an anaerobic condition within a denitrification tank;
- a nitrification and total oxidation step of contacting the wastewater with nitrifying bacteria under an aerobic condition within a nitrification tank with a BOD sludge load set to 0.08 kg-BOD/Kg-MLSS*day or smaller to self-oxidize the sludge; and
- a filtration step of filtering the sludge, generated in the total oxidation tank and introduced directly from the total oxidization tank, with a separation membrane having a pore size within a range of 0.1 to 5 μm, the steps being sequentially performed in this order;
- wherein a coagulant is added during the nitrification and total oxidization step.

14. The nitrogen-containing wastewater treatment method as claimed in claim 12, wherein within at least one of the nitrification tank, the denitrification tank and the total oxidization tank, a microorganism-immobilized carrier, with which the bacteria are immobilized by microorganisms, is used.

15. The nitrogen-containing waste treatment method as claimed in claim 14, wherein the microorganism-immobilized carrier is selected from the group consisting of a gel carrier, a plastic carrier and a filamentous carrier.

16. The nitrogen-containing wastewater treatment method as claimed in claim 15, wherein the microorganism-immobilized carrier is an acetalized polyvinyl alcohol gel.

17. The nitrogen-containing wastewater treatment method as claimed in claim 12, wherein the separation membrane is a hollow fiber membrane.

18. The nitrogen-containing wastewater treatment method as claimed in claim 12, wherein the BOD sludge load within the total oxidization tank is 0.05 kg-BOD/Kg-MLSS*day or smaller.

19. The wastewater treatment method with minimized excess sludge withdrawal of claim 12, (i) which comprises:
- an nitrification step of contacting wastewater with nitrifying bacteria under an aerobic condition within a nitrification tank;
- a denitrification step of contacting the wastewater with denitrifying bacteria under an anaerobic condition within a denitrification tank;
- a total oxidization step of self-oxidizing a sludge under an aerobic condition with a BOD sludge load set to 0.08 kg-BOD/Kg-MLSS*day or smaller; and
- a filteration step of filtering the sludge, generated in the total oxidation tank and introduced directly from the total oxidization tank, with a separation membrane having a pore size within the range of 0.1 to 5 μm, the steps being sequentially performed in this order;
- wherein a coagulant is added during the total oxidization step.

20. A wastewater treatment method comprising:
(a) producing sludge from a wastewater; then
(b) self-oxidizing the sludge under an aerobic condition within a total oxidization tank with a BOD sludge load set to 0.08 kg-BOD/Kg-MLSS*day or smaller to which a coagulant is added; then
(c) directly introducing the self-oxidized sludge from the total oxidation tank into a single sedimentation tank, then
(d) sedimenting the sludge within the sedimentation tank; and
(e) returning any sedimented sludge to the total oxidation tank without sequential sedimentation in another sedimentation tank.

21. The wastewater treatment method of claim 20, wherein the sludge is produced by an aeration step of contacting wastewater with a microorganism-immobilized carrier under an aerobic condition within an aeration tank prior to the total oxidation step.

22. The wastewater treatment method of claim 20, wherein the sludge is produced a nitrification step of contacting wastewater with nitrifying bacteria under an aerobic condition within a nitrification tank; and a denitrification step of contacting the wastewater with denitrifying bacteria under an anaerobic condition within a denitrification tank, prior to the total oxidation step.

23. The wastewater treatment method of claim 20, wherein the sludge is produced by a denitrification step comprising contacting wastewater with denitrifying bacteria under an anaerobic condition within a denitrification tank, prior to the total oxidation step which comprises contacting the denitrified wastewater with nitrifying bacteria under an aerobic condition within a nitrification tank with a BOD sludge load set to 0.08 kg-BOD/Kg-MLSS*day or smaller to self-oxidize the sludge.

24. A wastewater treatment method comprising:
(a) producing sludge from a wastewater; then
(b) self-oxidizing the sludge under an aerobic condition within a total oxidation tank with a BOD sludge load set to 0.08 kg-BOD/Kg-MLSS*day or smaller to which a coagulant is added; then
(c) filtering the self-oxidized sludge received directly from the total oxidation tank with a separation membrane having a pore size within a range of 0.1 to 5 μm.

25. The wastewater treatment method of claim 24, wherein the sludge is produced by an aeration step of contacting wastewater with a microorganism-immobilized carrier under an aerobic condition within an aeration tank prior to the total oxidation step.

26. The wastewater treatment method of claim 24, wherein the sludge is produced a nitrification step of contacting wastewater with nitrifying bacteria under an aerobic condition within a nitrification tank; and a denitrification step of contacting the wastewater with denitrifying bacteria under an anaerobic condition within a denitrification tank, prior to the total oxidation step.

27. The wastewater treatment method of claim 24, wherein the sludge is produced by a denitrification step comprising contacting wastewater with denitrifying bacteria under an anaerobic condition within a denitrification tank, prior to the total oxidation step which comprises contacting the denitrified wastewater with nitrifying bacteria under an aerobic condition within a nitrification tank with a BOD sludge load set to 0.08 kg-BOD/Kg-MLSS*day or smaller to self-oxidize the sludge.

* * * * *